R. F. MEINERS.
EMERGENCY RUNNING GEAR FOR VEHICLES.
APPLICATION FILED NOV. 15, 1913.
1,163,354.
Patented Dec. 7, 1915.
Fig. 1.
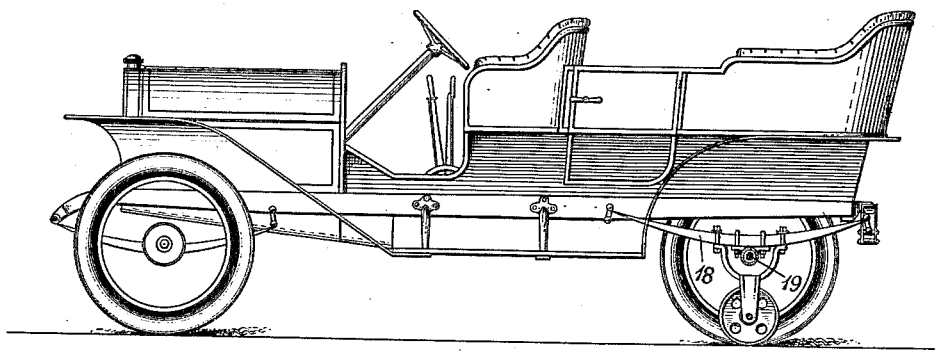
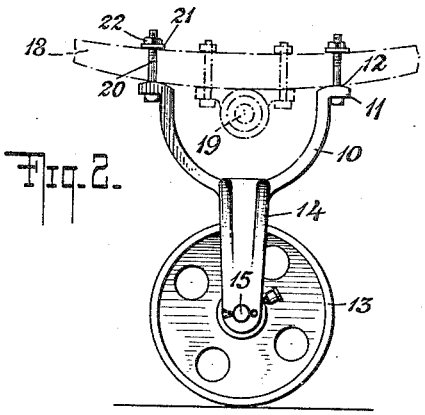
Fig. 2.
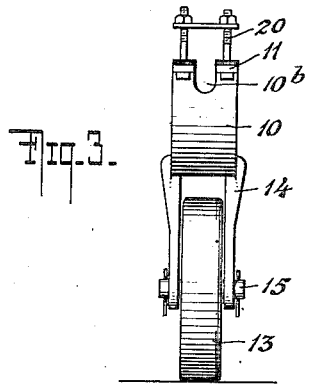
Fig. 3.
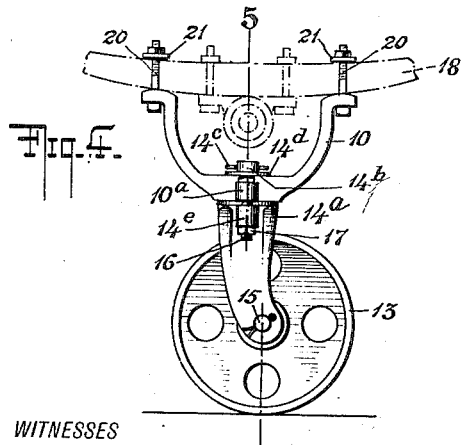
Fig. 4.
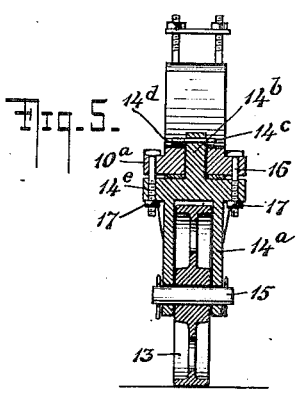
Fig. 5.
WITNESSES
George Du Bon
John A. Kehlenbeck
INVENTOR
RUDOLPH F. MEINERS
BY
Biesen & Knauth
ATTORNEYS

UNITED STATES PATENT OFFICE.

RUDOLPH F. MEINERS, OF BOONTON, NEW JERSEY.

EMERGENCY RUNNING-GEAR FOR VEHICLES.

1,163,354. Specification of Letters Patent. Patented Dec. 7, 1915.

Application filed November 15, 1913. Serial No. 801,148.

*To all whom it may concern:*

Be it known that I, RUDOLPH F. MEINERS, a citizen of the United States, and resident of Boonton, county of Morris, State of New Jersey, have invented certain new and useful Improvements in Emergency Running-Gear for Vehicles, of which the following is a specification.

My invention relates to emergency running gear for vehicles and has for its object to provide a device of this type which may be readily carried about in the vehicle without inconvenience so as to be always available for use.

A further object of my improvement is to provide an emergency running gear which in an emergency such as the breaking or damaging of an axle or a wheel, may be quickly and easily attached in operative position on the vehicle to permit the said vehicle to be readily propelled to its destination or to a repair shop, without discomfort to the occupants and with a minimum of strain upon the vehicle itself.

My invention will be fully described hereinafter and the features of novelty will be pointed out in the appended claims.

Reference is to be had to the accompanying drawings in which—

Figure 1 is a side elevation of an automobile with my invention attached thereto; Fig. 2 is an enlarged elevation of one form of my emergency running gear; Fig. 3 is an end elevation thereof; Fig. 4 is a view similar to Fig. 2 of another form of said emergency running gear and Fig. 5 is a sectional view thereof on the line 5—5 of Fig. 4.

As shown in Figs. 2 and 3 of the drawings my improved device comprises a substantially U-shaped member 10, the legs of which are provided with flanges 11 having their upper surfaces preferably curved as indicated at 12. A wheel 13 of any desired type is journaled in a forked member 14 to rotate about an axle 15, the forked member 14 depending from the member 10 and being either made as an integral part thereof or rigidly secured thereto.

In the form of my improvement illustrated in Figs. 4 and 5 the forked member 14$^a$ is provided with a rod 14$^b$ adapted to extend through a suitable aperture in the member 10 whereby the said forked member 14$^a$ is rotatable relatively to the member 10 about the axis of the rod 14$^b$. Any suitable means may be provided for maintaining the rod 14$^b$ against removal from the aperture in the member 10 as for instance a cotter pin 14$^c$ extending through said rod 14$^b$, a suitable washer 14$^d$ being in this case preferably located between said cotter pin 14$^c$ and the member 10 to take up wear. In order to prevent the forked member 14$^a$ from rotating relatively to the member 10 when this is desired, I have provided the member 10 and the member 14$^a$ respectively with lugs 10$^a$ and 14$^e$ having registering apertures adapted to accommodate bolts 16 held against removal therefrom by nuts 17. It will readily be seen that, when the bolts 16 are in operative position in the lugs 10$^a$ and 14$^e$, the member 14$^a$ is rigidly connected with the member 10 and is incapable of any rotative movement relatively thereto. It will be understood that this is only an example and that other means may be used for accomplishing the same result.

When an axle has become broken, wheel damaged or any other emergency requires the use of my device, the member 10 is placed beneath the vehicle spring 18 nearest the seat of trouble, in such a manner that said member 10 straddles the axle 19 and the flanges 11 engage the spring 18 at points on opposite sides of said axle and substantially equidistant therefrom. The flanges 11 are of sufficient width so as to extend transversely beyond the spring 18 at opposite sides and are provided with apertures for the accommodation of bolts 20. These bolts 20 are adapted to extend through suitable apertures in clamping plates 21 arranged to engage the upper surface of the spring 18 and are screw-threaded to receive nuts 22, the apertures in the flanges 11 and clamping plates 21 being so located that the bolts 20 will extend along and preferably in contact with the opposite side surfaces of the spring 18. It will readily be seen that, with this arrangement, the member 10 may be securely attached to the spring 18 and the emergency gear rigidly fastened in position by simply screwing the nuts 22 against the clamping plates 21 which bear against the upper surface of the spring 18. In this condition the bolts 20 coöperating with the spring 18 prevent any transverse shifting of the emergency gear relatively to said spring and the pressure of the clamping plates 21 upon said spring 18 prevent any shifting of said gear in the direction of the length of said spring 18. The curved surfaces 12 permit what might be termed a rocking movement of the emergency gear, which thus does not interfere with the resilient action of said spring under the influence of shocks or jars. The distance between the lowermost point on the periphery of the wheel 13 and the curved surfaces 12 is so determined that the vehicle will be evenly supported when the emergency gear is attached to a spring 18. By attaching the emergency gear to the spring 18 as described, strains are substantially removed from the broken axle or from an axle from which a damaged wheel has been removed and said emergency gear serves as a perfect substitute for the usual running gear and permits the vehicle to be readily propelled to its destination or to a repair shop with no discomfort to the occupants and with a minimum of strain upon the damaged portion of said vehicle.

My improved emergency gear may be readily carried about in the vehicle so as to be at all times available for use and may be readily attached in operative position when necessary.

By removing the bolts 16 from the lugs 10$^a$ and 14$^e$ to permit the member 14$^a$ and wheel 13 to rotate about the axis of the rod 14$^b$ relatively to the member 10, this form of my device is adapted particularly for use in case an accident has happened to the front axle or to a front or steering wheel. In such case the said member 14$^a$ may be connected with the usual steering gear in any convenient manner so that the wheel 13 may be manipulated to properly steer the vehicle. When the members 10 and 14$^a$ are rigidly connected the device operates in the same way as the form shown in Fig. 2 and in this condition is best adapted for use at the rear of the vehicle. The form of my improvement shown in Figs. 4 and 5 may, therefore, be used at the front or at the rear of the vehicle with equally efficient results.

It is, of course, to be understood that while the form of my invention shown in Figs. 2 and 3 may be used to best advantage at the rear of the vehicle or in connection with the driving axle, the same is also capable of use in an emergency at the front of said vehicle.

To permit either form of my device to be readily attached to vehicles in which stay rods are used the legs of the members 10 may be provided with recesses 10$^b$ for the accommodation of said stay rods which usually extend from the rear axle to some part of the chassis or body of the vehicle, it being obvious that the device may be so constructed and proportioned as to be capable of ready attachment without interference with other parts of said vehicle.

It will also be apparent that my emergency gear may be used in connection with any type of vehicle and that the illustrated use in connection with an automobile is only an example of such use.

Various changes in the specific forms shown and described may be made within the scope of the claims without departing from the spirit of my invention.

I claim:

1. An emergency running gear for vehicles comprising upwardly diverging rigid arms, flanges on said arms having curved bearing surfaces adapted to engage the lower surface of the vehicle spring, means for detachably connecting said flanges to said spring whereby said running gear is secured in operative position, and a wheel carried by said arms.

2. An emergency running gear for vehicles comprising an upright substantially U-shaped rigid support located beneath and in engagement with the vehicle spring at spaced intervals, means for detachably connecting said support to said spring, a downwardly open forked member depending from said support and a wheel journaled in said support.

3. An emergency running gear for vehicles comprising an upright substantially U-shaped rigid support located beneath and in engagement with the vehicle spring at spaced intervals, said support having a bearing surface at its lower end, a downwardly open forked member having a complementary bearing surface at its upper end, a connection for pivotally connecting said support and forked member together and a wheel journaled in said forked member.

In testimony whereof I have hereunto set my hand in the presence of two subscribing witnesses.

RUDOLPH F. MEINERS.

Witnesses:
JOHN A. KEHLENBECK,
PETER M. FERNANDEZ.